(12) United States Patent
Nunez et al.

(10) Patent No.: US 8,646,478 B2
(45) Date of Patent: Feb. 11, 2014

(54) TANK VALVE SYSTEM

(75) Inventors: Mario Nunez, Chicago, IL (US); Krzysztof A. Pankiewicz, Buffalo Grove, IL (US)

(73) Assignee: Delaware Capital Formation, Inc., Wilmington, DE (US)

( * ) Notice: Subject to any disclaimer, the term of this patent is extended or adjusted under 35 U.S.C. 154(b) by 611 days.

(21) Appl. No.: 12/587,251

(22) Filed: Oct. 5, 2009

(65) Prior Publication Data
US 2011/0079294 A1    Apr. 7, 2011

(51) Int. Cl.
*B60P 3/30*   (2006.01)

(52) U.S. Cl.
USPC .................. 137/347; 137/315.27; 137/614.19

(58) Field of Classification Search
USPC ........... 137/71, 315.27, 315.33, 329.1, 329.4, 137/347, 614.14, 614.19, 460, 614.21; 251/143
See application file for complete search history.

(56) References Cited

U.S. PATENT DOCUMENTS

| 1,067,188 | A | * | 7/1913 | Munson | 137/614.14 |
|---|---|---|---|---|---|
| 1,306,150 | A | | 6/1919 | Kessler | |
| 1,377,360 | A | * | 5/1921 | Melvin | 137/614.14 |
| 1,411,483 | A | * | 4/1922 | Floyd | 137/614.14 |
| 1,432,216 | A | | 10/1922 | Steinmeyer | |
| 1,511,610 | A | | 10/1924 | Holmes | |
| 1,535,576 | A | * | 4/1925 | Clark | 137/614.14 |
| 1,698,616 | A | | 1/1929 | Woodham | |
| 1,787,445 | A | * | 1/1931 | Gade | 137/329.4 |
| 1,943,941 | A | * | 1/1934 | Munn | 137/329.4 |
| 2,098,399 | A | | 11/1937 | Munson | |
| 2,526,795 | A | | 10/1950 | Andrews | |
| 2,831,500 | A | | 4/1958 | Fennema et al. | |
| 2,922,544 | A | | 1/1960 | Hibbard et al. | |
| 3,587,634 | A | * | 6/1971 | Krause | 137/614.19 |
| 3,872,875 | A | | 3/1975 | Raidl, Jr. | |
| 5,018,552 | A | * | 5/1991 | Politi et al. | 137/614.11 |
| 5,150,880 | A | | 9/1992 | Austin, Jr. et al. | |
| 5,465,753 | A | | 11/1995 | Schwartz | |
| 5,673,897 | A | | 10/1997 | Crochet et al. | |
| 5,782,259 | A | | 7/1998 | Ledbetter et al. | |
| 5,941,268 | A | | 8/1999 | Ross, Jr. | |
| 6,431,196 | B1 | | 8/2002 | Brazier et al. | |
| 6,668,853 | B2 | | 12/2003 | Dean | |

* cited by examiner

*Primary Examiner* — Craig Schneider
*Assistant Examiner* — Craig J Price
(74) *Attorney, Agent, or Firm* — Seyfarth Shaw LLP

(57) ABSTRACT

A fluid flow controlling system for controlling the flow of fluid from a tank having an exterior surface is provided. The system includes an angle valve and a check valve. The angle valve is coupled to the tank and located substantially on an outer side of the exterior surface. The angle valve includes a spindle, a valve seat and a valve seal. The spindle, valve seat and valve seal are located on an inner side of the exterior surface. The check valve is coupled to the tank and located substantially on the inner side of the exterior surface. The check valve is movable between a closed state and an open state by the spindle.

9 Claims, 4 Drawing Sheets

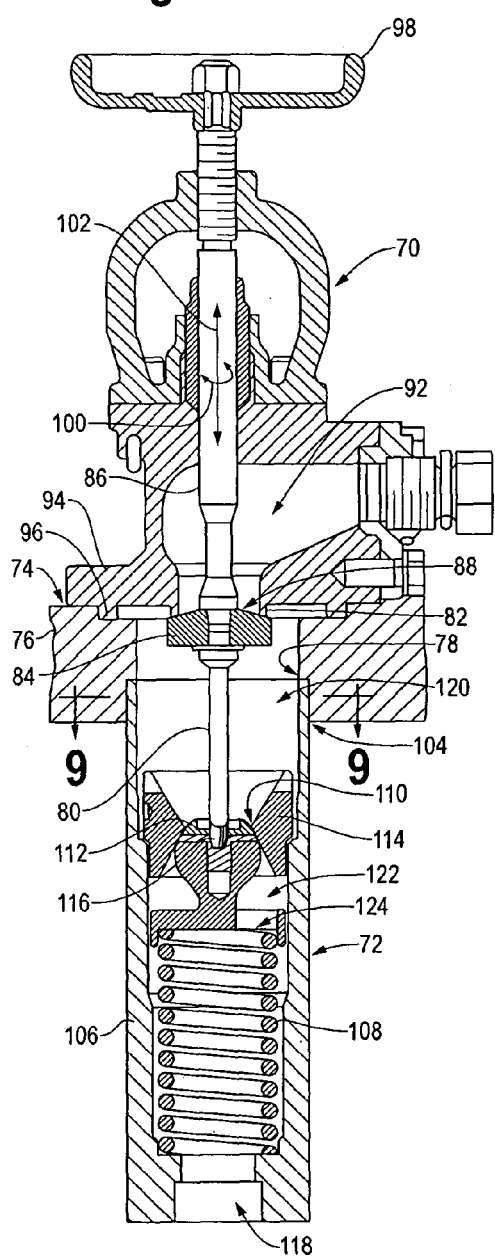
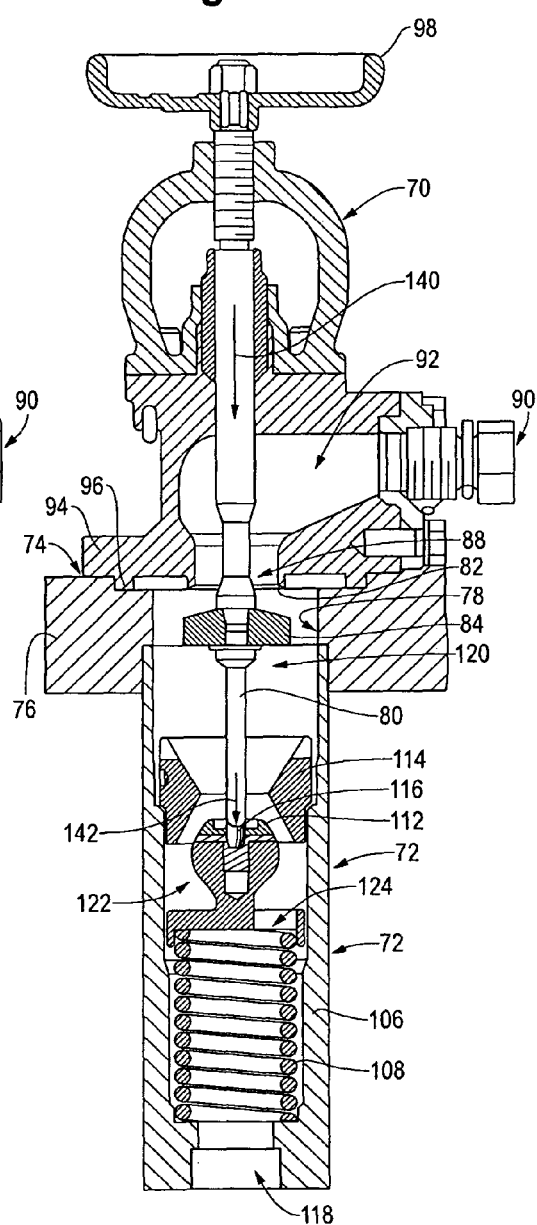
Fig. 8A
Fig. 8B

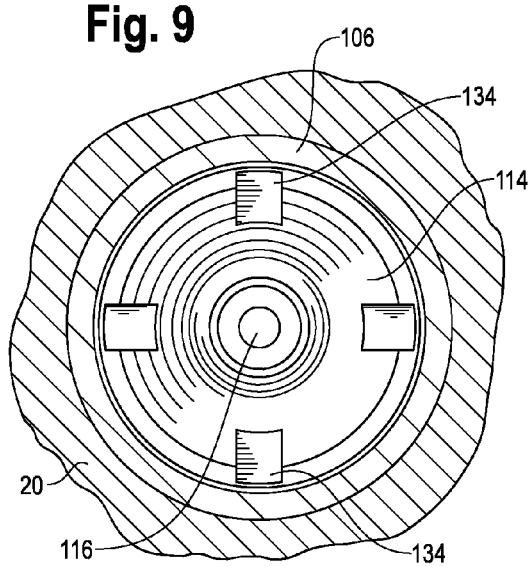
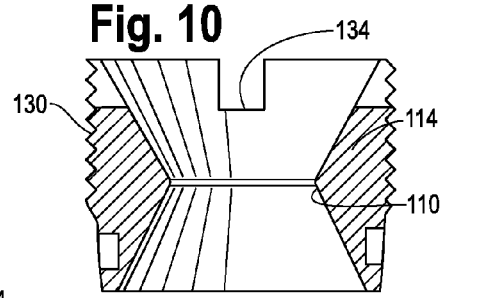
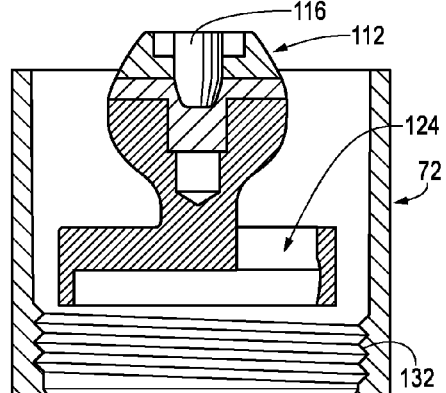
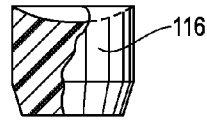
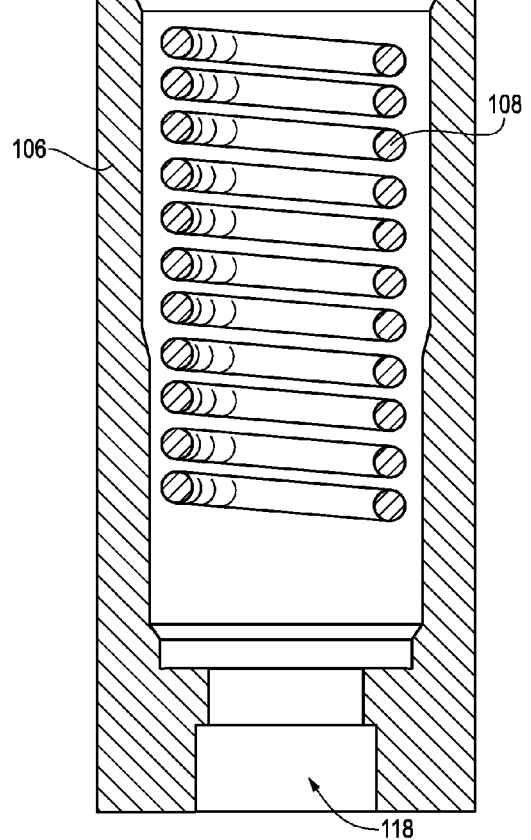

TANK VALVE SYSTEM

FIELD OF THE INVENTION

This invention relates generally to tank valve systems, and in more particular applications to angle valve and check valve combinations.

BACKGROUND

Valves and valve systems are used to control pressure within containers and flow into and out of containers. For example, angle valves and check valves can be used in combination to control flow of fluid into and/or out of tanks. In this regard, check valves are used in addition to angle valves for a number of reasons. For example, check valves are sometimes used to prevent back flow of fluid. Check valves are also sometimes used to minimize the wear on the angle valve that might result from the high pressure within the tank. In yet another form, check valves might be used to minimize the contact between the fluid and the angle valve to lessen the wear on the angle valve that might occur from corrosive or other fluids maintained in the tank.

Such valves and valve systems can be utilized in a number of applications. For example, these valve systems are often used in rail cars for transporting fluids, including liquids and/or gas. Generally, rail cars include at least one location on the car where inlet and outlet valves may be located, along with other related devices, such as pressure control valves, gauges and other structures. However, generally these valves, including pressure relief valves, are often located on an exterior of the rail car. By having the valves located on the exterior of the rail car, the valves are more prone to being damaged and/or accidentally removed if contacted by other machinery or if the rail car were to overturn.

Valves, including overpressure valves, are also used on other containers such as ISO and tote tanks. In general, an ISO tank is a pressure vessel mounted in a frame that complies with the standards of the International Standards Organization (ISO). ISO and tote tanks are commonly used for transporting chemicals, especially internationally. In some instances, these types of tanks are approximately one quarter the size of rail cars. Additionally, the tanks are built with frames or other structural support surrounding the tank to protect the tank and allow it to sit squarely on the ground or on top of other tanks. These types of tanks can be transported in a number of ways, including, but not limited to, rail, truck and sea.

ISO and tote tanks generally include similar valves and valve systems to those described with respect to rail cars. For example, ISO and tote tanks may include overpressure valves and/or rupture discs for preventing the tanks from rupturing during an overpressure situation. Just as described with respect to rail cars, ISO and tote tanks are also susceptible to tipping over and/or having the valves damaged or broken off by other machinery.

However, conventional angle valve and check valve combinations are often designed and installed such that they are an interconnected unit. In this regard, it can become dangerous if the angle valve is sheared off or damaged while in operation because the connection of the check valve might also be damaged. Further, angle valves typically extend a significant distance from the tank, thereby increasing the chance that the valve is damaged or sheared off. Additionally, once installed, angle valves and check valves can be problematic to replace or maintain. For example, oftentimes, the entire angle valve and check valve combination must be removed to replace parts on either of the angle valve or check valve. Such a removal process is time consuming and costly.

SUMMARY

In one form, a fluid flow controlling system for controlling the flow of fluid from a tank having an exterior surface is provided. The system includes an angle valve and a check valve. The angle valve is coupled to the tank and located substantially on an outer side of the exterior surface. The angle valve includes a spindle, a valve seat and a valve seal. The spindle, valve seat and valve seal are located on an inner side of the exterior surface. The check valve is coupled to the tank and located substantially on the inner side of the exterior surface. The check valve is movable between a closed state and an open state by the spindle.

According to one form, a fluid flow controlling system for controlling the flow of fluid through an opening in a tank having an exterior surface is provided. The system includes an angle valve and a check valve. The angle valve is coupled to the tank and located substantially on an outer side of the exterior surface and adjacent the opening. The angle valve includes a spindle, a valve seat and a valve seal. The check valve is coupled to the tank and located substantially on an inner side of the exterior surface adjacent the opening. The check valve includes a housing, a biasing assembly, a valve seat and a valve seal. The check valve is movable between a closed state and an open state by the spindle. The angle valve is independently removable from the tank and the biasing assembly, valve seat and valve seal are all removable from the housing through the opening.

In accordance with one form, the check valve includes a housing, a biasing assembly, a valve seat and a valve seal such that the biasing assembly, valve seat and valve seal are all removable from the housing while the check valve is coupled to the tank.

In one form, the angle valve is first removed from the tank to remove the biasing assembly, valve seat and valve seal.

According to one form, the angle valve is coupled to the tank at a recessed portion of the exterior surface.

In accordance with one form, the spindle rotates about a vertical axis and moves along the vertical axis to contact and move the check valve between the closed state and open state.

In one form, the check valve includes a removable insert for contact with the spindle.

According to one form, removeable insert is polytetrafluoroethylene.

In accordance with one form, the tank is a rail car tank.

In one form, the tank is an ISO tank.

According to one form, the tank is a tote tank.

In accordance with one form, the angle valve includes a spindle, a valve seat and a valve seal, the spindle, valve seat and valve seal located on the inner side of the exterior surface.

Other forms are also contemplated as understood by those skilled in the art.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its constructions and operation, and many of its advantages should be readily understood and appreciated.

FIG. 8A is a cross-sectional view of an angle valve and check valve in a closed condition;

FIG. 8B is a cross-sectional view of an angle valve and check valve in an open condition;

FIG. 9 is a top view of the check valve;

FIG. 10 is an exploded cross-sectional view of the check valve; and

FIG. 11 is a partial cross-sectional view of an insert for the check valve.

Figure 1:
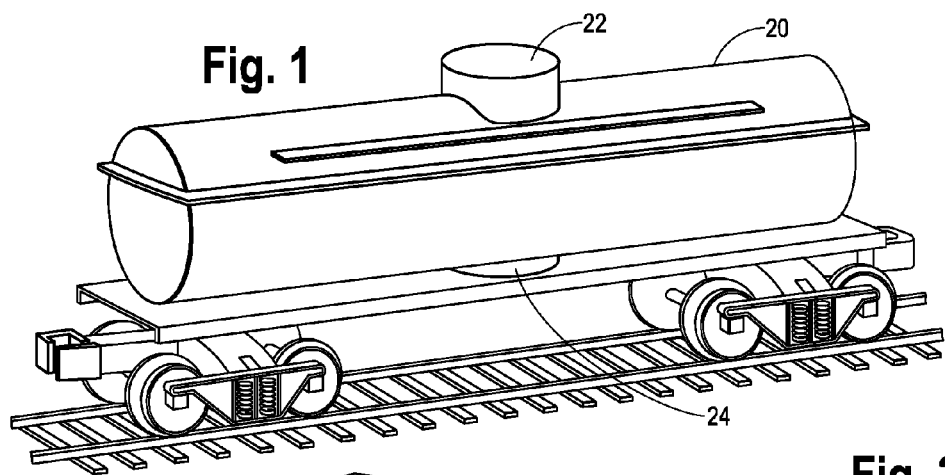
FIG. 1 is a perspective view of a rail car with valves located within a tank car cover.

Various figures are presented to further aid one skilled in the art in understanding the various forms of the tank valve system. However, the present invention should not be construed to be limited to the forms depicted in the figures and described herein.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Figure 2:
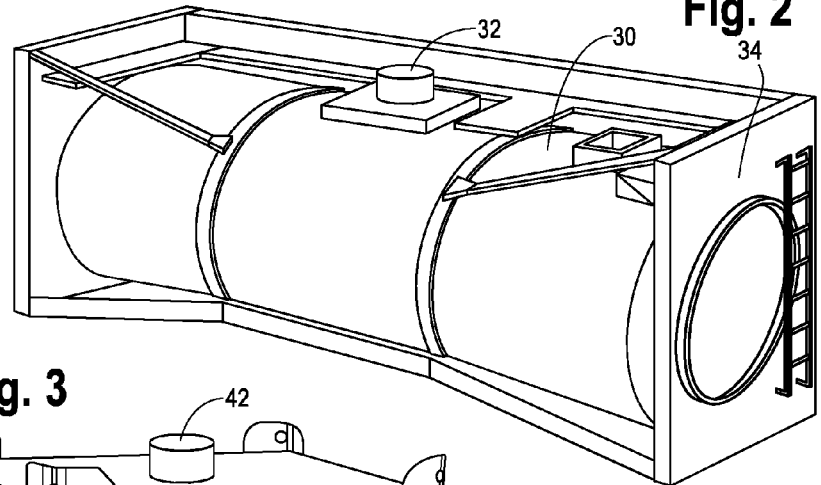
FIG. 2 is a perspective view of an ISO tank with valves located within a valve cover.
Figure 3:
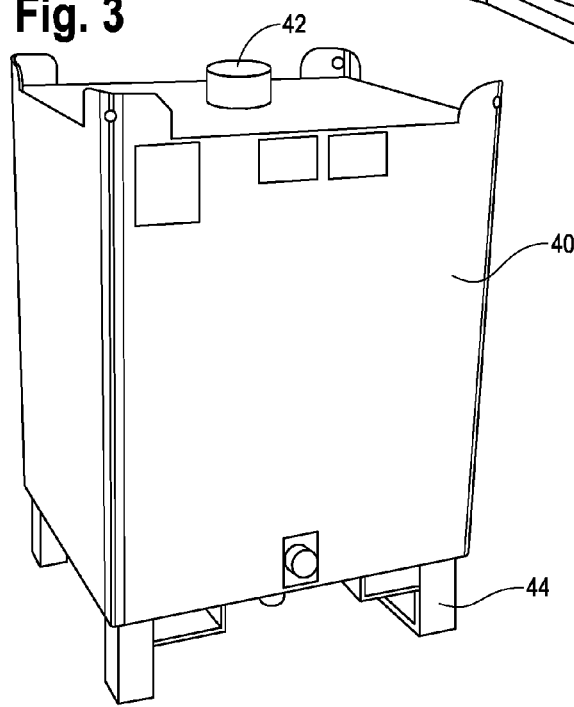
FIG. 3 is a perspective view of a tote tank with valves located within a valve cover.

Referring to FIGS. 1-3, various containers are illustrated. For example, referring to FIG. 1, a rail car 20 is illustrated. The rail car 20 can be used to transport fluids via rail, and more particularly, may be suitable for transporting large volumes of fluids. The rail car 20 includes a cover 22 which can be used to cover various structures and devices, including, but not limited to, valves, gauges, inlets, outlets and other structures. The structures contained under the cover 22 will be explained in more detail below.

Further, the rail car 20 may include other structures as understood by those skilled in the art. For example, the rail car may include a lower cover 24 to contain additional structures similar to those described above. Specifically, the lower cover 24 may contain additional inlets, outlets, valves and gauges. Other features of the rail car 20 will not be discussed herein for the sake of brevity but should be readily understood by those skilled in the art.

Referring now to FIG. 2, an ISO tank 30 is illustrated. The ISO tank 30 includes a cover 32 which can be used to cover various structures and devices, including, but not limited to, valves, gauges, inlets, outlets and other structures. The structures contained under the cover 32 will be explained in more detail below. Generally, the ISO tank 30 is used to transport slightly smaller volumes of fluid and/or may be used for transporting fluids internationally. Additionally, ISO tanks generally include external framework or support 34 to provide extra strength to the tank 30 and also permit the tank 30 to sit squarely on a surface or another tank. Other features of the ISO tank 30 will not be discussed herein for the sake of brevity but should be readily understood by those skilled in the art.

A tote tank 40 is illustrated in FIG. 3. The tote tank 40 includes a cover 42 which can be used to cover various structures and devices, including, but not limited to, valves, gauges, inlets, outlets and other structures. The structures contained under the cover 42 will be explained in more detail below. Generally, the tote tank 40 is used to transport slightly smaller volumes of fluid and/or may be used for transporting fluids internationally. Additionally, tote tanks generally include supports 44 to provide extra strength to the tank 40 and also permit the tank 40 to sit squarely on a surface or another tank. Other features of the tote tank 40 will not be discussed herein for the sake of brevity but should be readily understood by those skilled in the art.

Figure 4:
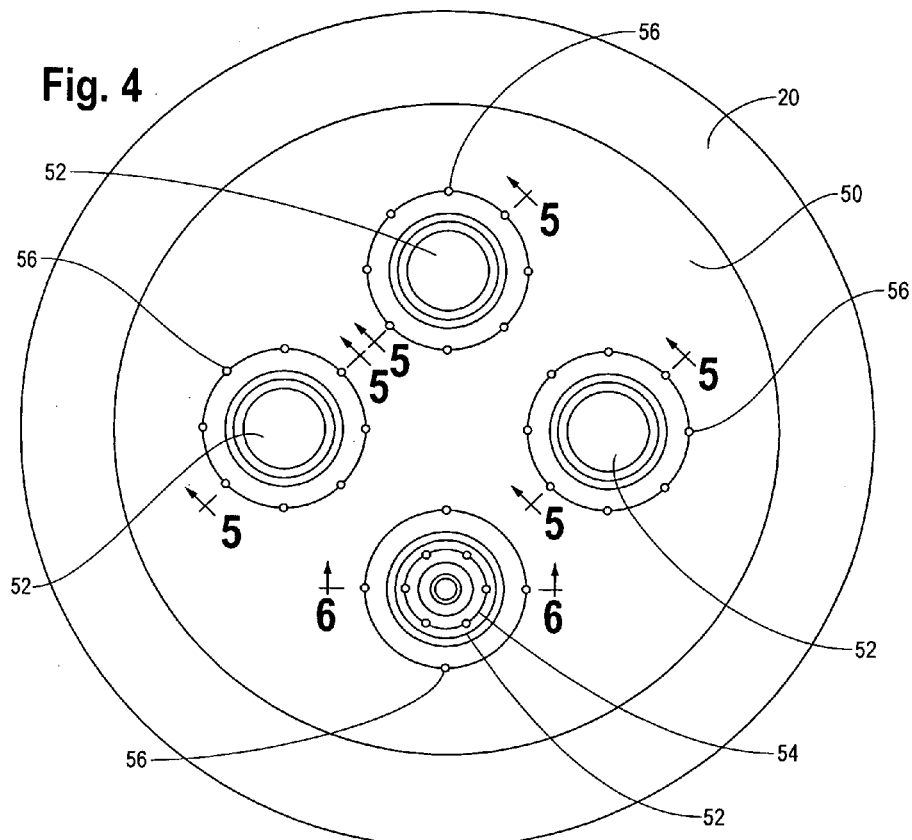
FIG. 4 is a top view of a tank plate with various openings and valve ports.

Referring now to FIG. 4, a plate 50 is illustrated. The plate 50 generally is located beneath a cover for a tank. For example, the plate 50 shown in FIG. 4 is located on the rail car 20 beneath the cover 22. However, it should be understood that the plate 50 may similarly be located on the ISO tank 30 or tote tank 40 or any other suitable tank. Furthermore, it should be understood that the plate 50 need not be enclosed within a cover, but may instead be exposed. Additionally, the plate 50 may also be formed as an integral part of the tank 20 or may be a separate component affixed to the tank 20, as understood by those skilled in the art.

Figure 5:
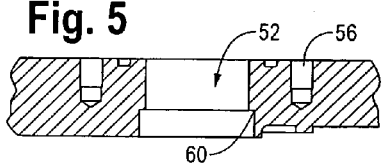
FIG. 5 is a cross-sectional view of an opening taken along line 5-5 of FIG. 4.

The plate 50 may include any number of openings 52. The openings 52 can be used to install valves, gauges, inlets, outlets and the like. For example, as shown in FIG. 5, a rupture disc subassembly 54 is installed in one of the openings 52. Generally, when the tank 20 is in operation to transport fluid, the remaining openings 52 will have valves, gauges or the like or will otherwise be sealed off so as to contain the fluid within the tank 20. In this regard, mounting holes 56 are generally located around the periphery of the openings 52 so as to provide locations for connectors (not shown). It should be understood that any number of mounting holes 56 may be included and further, that other forms of mounting structures besides mounting holes 56 may be used with the openings 52.

Figure 6:
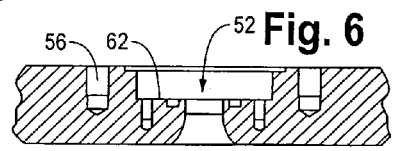
FIG. 6 is a cross-sectional view of an opening taken along line 6-6 of FIG. 4.

Further, as best seen in FIGS. 5 and 6, the openings 52 may include different shapes and sizes as desired for different types of valves, gauges and the like. For example, the opening 52 shown in FIG. 5 may be shaped and sized to receive an angle valve and check valve assembly while the opening in FIG. 6 may be shaped and sized to receive a rupture disc subassembly and a pressure relief valve. Further, it should be understood that the openings 52 may include beveled edges 60, recessed areas 62 and other structures and features depending on the type of valve, gauge or other structure coupled to the opening 52.

Figure 7:
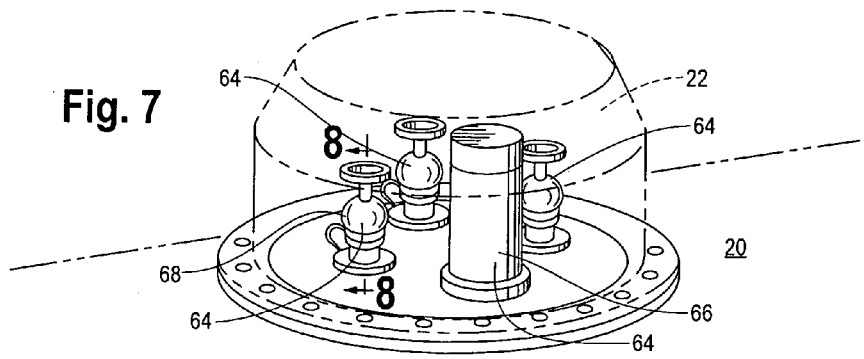
FIG. 7 is a top perspective view of valves installed in a tank plate with a valve cover shown in phantom.

Referring now to FIG. 7, one embodiment of the tank 20 is illustrated with a number of valves 64 installed, including a pressure control system 66 and an angle valve 68. As shown in this figure, when in operation, this embodiment includes the cover 22, shown in phantom, for covering the valves 64 and providing additional protection. However, this cover 22 can be opened when desired to have direct access to the valves 64.

The details of the operation and installation of the pressure control system 66 will now be discussed in more detail. While this system 66 will be discussed as being installed on the tank 20, it should be understood by those skilled in the art that the system 66 can be installed on the ISO tank 30, tote tank 40 and other tanks.

Referring to FIG. 8A, a cross-sectional view of an angle valve 70 and a check valve 72 is shown in a closed condition. The angle valve 70 is coupled to the plate 50 and/or the tank 20 and is located substantially on an outer side 74 of an exterior surface 76 of the plate 50 and/or the tank 20. Further, in one form, the angle valve 70 is located adjacent an opening 78 in the tank 20. The angle valve 70 includes a spindle 80, a valve seat 82, a valve seal 84 and a valve stem 86. The angle valve 70 includes a first inlet/outlet port 88 and a second inlet outlet port 90. These ports 88,90 are utilized to transfer fluid through the angle valve 70 via a fluid flow path 92.

The angle valve 70 may also include a base 94 including a mounting portion 96. The mounting portion 96 may be used to more securely seal the angle valve 70 to the plate 50 and/or the tank 20. The angle valve 70 may also include a control mechanism, such as handle 98. In one form, the handle 98 is coupled to the valve stem 86. In this form, as the handle 98 is rotated, the valve stem 86 also rotates, as indicated by arrow 100, and also moves in a vertical direction, as indicated by arrow 102. In this regard, as the handle 98 is rotated, the valve stem 86, and resultantly the valve seal 84, will also rotate and move in a vertical direction, depending on the direction of rotation of the handle 98.

The angle valve 70 may also include further structures and features understood by those skilled in the art. For example, the angle valve 70 may also include gaskets, bushings, seals, and the like for sealing the angle valve 70 and sealing the connections between the angle valve 70 and the tank 20 and the angle valve 70 and other components. Further, the angle valve 70 may include connectors, such as bolts or the like, for connecting the angle valve 70 to the tank 20. Any suitable type of connector may be used as appreciated by those skilled in the art. Further, additional components may be included as part of the angle valve 70 as would be understood by those skilled in the art.

The check valve 72 is also coupled to the plate 50 and/or the tank 20 and is located substantially on an inner side 104 of the exterior surface 76. Further, the check valve 72 is located adjacent the opening 78 in the tank 20. The check valve 72 includes a housing 106, a biasing assembly 108, a valve seat 110 and a valve seal 112.

The check valve 72 may include a valve seat assembly 114 which maintains the valve seat 110 in the housing 106. Further, the check valve 72 may also include an insert 116 located on the valve seal 112 for contact with the spindle 80. In one form, the insert 116 is replaceable much that as the insert 116 is worn away, a new insert 116 can be installed. Further, the insert 116 can be made from any number of different materials to resist wear. For example, in one form, the insert 116 is made from polytetrafluoroethylene (PTFE). However, it should be understood that other materials can be used, such as, for example, Stellite® 21.

The check valve 72 includes a first inlet/outlet port 118 and a second inlet/outlet port 120 and a fluid flow path 122 between the ports 118,120. Further, the valve seal 112 includes an opening 124 for permitting fluid to flow past the valve seal 112 when the check valve 72 is in an open condition. The check valve 72 is generally maintained and biased towards the closed condition shown in FIG. 8A as a result of the biasing assembly 108. The biasing assembly biases the valve seal 112 towards the valve seat 110 to thereby seal the check valve 72. However, the check valve 70 is permitted to move in a vertical direction indicated by arrow 102.

The assembly and operation of the angle valve 70 and check valve 72 will now be described in more detail. The check valve 72 or the angle valve 70 can be installed on the tank 20 in any order, depending on the availability of access to the interior of the tank. In one form, the check valve 72 can be installed first for pressure testing, followed by the installation of the angle valve 70. Further, the entire check valve 72 or simply the check valve housing 106 can be installed, with the internal components of the check valve 72 installed later.

In the case where the housing 106 alone is installed on the tank 20, the internal components can later be installed through the opening 78 in the tank. Generally, the biasing assembly 108 will be positioned through the opening and into the housing 106. Next, the valve seal 112 will be located on top of the biasing assembly 108 in the housing 106. Next, the valve seat assembly 114 can be positioned through the opening 78. In one form, as illustrated in FIG. 10, the valve seat assembly 114 includes a threaded portion 130 while the housing 106 includes a corresponding threaded portion 132. Additionally, the valve seat assembly 114 may include installation structure, such as apertures 134. The apertures 134 can be designed such that they are accessible through the opening 78 to cooperate with a tool to help screw the valve seat assembly 114 to the housing 106 to be secured. Further, the valve seat assembly 114 may include other optional structure such as a recess 136 for a gasket or other sealing material.

As discussed above, the angle valve 70, in some instances, may be installed either before or after the installation of the check valve 72, depending on if the installer needs access through the opening 78. It should be noted that the angle valve 70 and check valve 72 can be coupled to the tank 20 in any manner understood by those skilled in the art. For example, in one form, the check valve housing 106 can be welded or otherwise secured to the tank 20 while the angle valve 70 is secured using bolts or other connectors. However, it should be understood that each of the angle valve 70 and the check valve 72 can be coupled to the tank such that one or both of the structures is removable.

The operation of the angle valve 70 and check valve 72 should be understood by those skilled in the art in view of the figures and description herein. However, a brief description of one form of the operation will be provided for clarity. Referring to FIG. 8A, the angle valve 70 and check valve 72 are shown in the closed condition whereby fluid is not permitted to flow past the check valve 72. As described above, during operation, the handle 98 can be rotated whereby the valve stem will displace downwardly, as illustrated by arrow 140 in FIG. 8B. Resultantly, the valve seal 84 will also displace downwardly, thereby allowing fluid to flow into the angle valve 70. As the valve stem 86 displaces downwardly, so does the spindle 80, as illustrated by arrow 142. In this regard, the spindle 80 will contact the valve seal 112, and more particularly the insert 116, to thereby force the valve seal 112 downwardly against the force of the biasing assembly 108. Thus, fluid will be permitted to flow through the check valve 72, through the angle valve 70 and into or out of the tank 20.

It should be understood that, in one form, the check valve 72 opens after the angle valve 70 opens. Furthermore, it should be understood that the angle valve 70 and/or the check valve 72 can be used to control the flow rate through the angle valve 70, check valve 72 and tank 20. In this regard, the distance that the valve seals 84,112 are displaced can influence the flow rate. For example, the greater distance the valve seals 84,112 are displaced, the greater the flow rate. Other flow characteristics of the angle valve 70 and check valve 72 would be understood by those skilled in the art.

Further, the above described angle valve 70 and check valve 72 can be used in a variety of situations. For example, in one form, as shown in FIGS. 8A and 8B, the valve seal 84 is located substantially below the outer side 74 of the exterior surface 76. Also, in one form, the valve seal is located within the thickness of the exterior surface. In this regard, the overall height of the angle valve 70 can be minimized. By lowering the height of the angle valve 70, in some forms, it becomes less likely that the angle valve 70 will be damaged or sheared off by the tank 20 overturning or by contacting other structures. Moreover, if the angle valve 70 is sheared off, the check valve 72 will likely maintain the fluid in the tank 20.

Additionally, by removing the angle valve 70, the contents of the housing 106 can be removed through the opening 78. Generally, typical check valves installed on tanks must be removed from the inside of the tank to replace or maintain the check valve. In one form, the present check valve 72 can have the valve seat assembly 114, the valve seal 112 and the biasing assembly 108 removed through the opening 78 while the housing 106 remains installed on the tank 20. Furthermore, the check valve 72 includes the removable and/or replaceable insert 116.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A fluid flow control system for controlling the flow of a fluid through an opening in a tank having inner and outer sides delineated by an exterior surface, the system comprising:
   an angle valve coupled to the tank on the outer side and adjacent the opening, the angle valve including a valve seat, a valve seal adapted to engage the valve seat, and a spindle extending from the valve seal opposite the valve seat, wherein the valve seal is disposed below the outer side of the exterior surface of the tank; and
   a check valve coupled to the tank substantially on the inner side adjacent the opening independent of the angle valve, the check valve including a housing, a check valve seat disposed in the housing, a check valve seal disposed in the housing and adapted to engage the check valve seat, and a biasing structure disposed in the housing and adapted to bias the check valve seal into engagement with the check valve seat, the check valve adapted to engage the spindle and be moved between closed and open states by the spindle,
   wherein the angle valve is adapted to be independently removable from the tank allowing the check valve to maintain the fluid in the tank when the angle valve is removed, and wherein the biasing structure, the check valve seat and the check valve seal of the check valve are adapted to be removable from the housing through the opening.

2. The fluid flow control system of claim 1, wherein the angle valve is adapted to be removed from the tank to allow the biasing assembly, the check valve seat and the check valve seal to be removed.

3. The fluid flow control system of claim 1, wherein the angle valve is coupled to the tank at a recessed portion of the exterior surface.

4. The fluid flow control system of claim 1, wherein the spindle is adapted to rotate about a vertical axis and move axially along the vertical axis to engage and move the check valve between the closed state and open state.

5. The fluid flow control system of claim 1, wherein the check valve includes a removable insert adapted to engage the spindle.

6. The fluid flow control system of claim 5, wherein the removable insert is constructed of polytetrafluoroethylene.

7. The fluid flow control system of claim 1, wherein the tank is a rail car tank.

8. The fluid flow control system of claim 1, wherein the tank is an ISO tank.

9. The fluid flow control system of claim 1, wherein the tank is a tote tank.

* * * * *